(12) United States Patent
Hada (10) Patent No.: US 6,236,827 B1
(45) Date of Patent: May 22, 2001

(54) IMAGE FORMING APPARATUS THAT PREVENTS COLOR DEVIATION OF IMAGE

(75) Inventor: Yoshinobu Hada, Aichi-ken (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/412,329

(22) Filed: Oct. 5, 1999

(30) Foreign Application Priority Data

Oct. 7, 1998 (JP) .................................................. 10-285677

(51) Int. Cl.⁷ .................................................. G03G 15/01
(52) U.S. Cl. .................................................. 399/301; 399/49
(58) Field of Search .................................. 399/301, 51, 60, 399/49; 347/116, 248

(56) References Cited

U.S. PATENT DOCUMENTS 5,854,958 * 12/1998 Tanimoto et al. ...................... 399/49
5,875,380 * 2/1999 Iwata et al. ........................... 399/301
6,008,826 * 12/1999 Foote et al. ........................... 347/116

FOREIGN PATENT DOCUMENTS

| 1-112266 | 4/1989 | (JP) . |
| 1-141746 | 6/1989 | (JP) . |
| 4-131750 | 5/1992 | (JP) . |

* cited by examiner

*Primary Examiner*—Quana M. Grainger
(74) *Attorney, Agent, or Firm*—Morrison & Foerster LLP (57) ABSTRACT

At least two registration marks are formed for each of the reproduction colors cyan, magenta, yellow, and black. Each of the marks for each color is formed at a different position in the main scanning direction. Each position of the marks is detected, and the deviation is obtained for each color from the detection result. Using the obtained deviations, a correction approximation function is formulated that is used for determining writing positions for pixels of an image. In accordance with the correction approximation function, an image writing position at which an image forming unit starts writing is corrected, so that color deviations caused from various factors can be prevented.

17 Claims, 9 Drawing Sheets

IMAGE FORMING APPARATUS THAT PREVENTS COLOR DEVIATION OF IMAGE

This application is based on application No. 10-285677 filed in Japan, the content of which is hereby incorporated by reference.

BACKGROUND OF THE INVENTION

(1) Field of the Invention

The present invention relates to an image forming apparatus that prevents color deviations from occurring to a reproduced image.

(2) Description of Related Art

In general, when a color image is formed using a full-color image forming apparatus, data of an image to be formed is divided into reproduction colors cyan, magenta, yellow, and black. A toner image is first formed for each reproduction color, and then a color image is formed by transferring the toner images onto, for example, a recording sheet. If image forming positions for the colors are deviated from one another, color deviations occur to a reproduced color image. This results in an extremely deteriorated image quality. Hereinafter, the reproduction colors are respectively referred to as C, M, Y, and K and components related to these colors are assigned numerals with a corresponding C, M, Y, or K.

As one example of a conventional full-color image forming apparatus, there are so-called "tandem-type" image forming apparatuses. A tandem-type image forming apparatus has image forming units corresponding to reproduction colors set in line in a direction in which a recording sheet is transported on a transfer belt (this direction is referred to as the "transporting direction" hereinafter). The apparatus forms a color image by transferring the toner images formed in the reproduction colors while adjusting a timing of image formation for each reproduction color. On this account, color deviations are likely to happen when a color image is formed using the "tandem-type" image forming apparatus. One of the biggest problems is how such color deviations can be reduced.

The color deviations may be caused when image forming positions for the four colors are uniformly deviated one another. Other than this, color deviations may be caused when scanning lines formed on photosensitive drums by laser beams are skewed or bowed, or when a scaling factor varies, and they may differently occur for each image forming unit. These cases take place due to the following reasons. One reason is non-uniformity of refraction characteristics of scanning lenses provided for an optical scanning system that scans the laser beams across the photosensitive drums of the image forming units. Another reason is inadequate adjustments to angles of redirecting mirrors. As a further reason, the color deviation is ascribable to displacements in the image forming positions that are caused by expansions of position setting members in consequence of changes in temperature.

To address these problems causing color deviations, various techniques for correcting the image forming positions have been suggested for each problem. As one example, suppose that the image forming positions are deviated from one another on the whole in both the main scanning and the sub-scanning directions. In this case, the problem can be avoided by changing an exposure timing and an image formation timing for each image forming unit in the main scanning and sub-scanning directions. However, if only these timings are controlled, color deviations caused from skews, bows, or variations in the scaling factors cannot be avoided.

For color deviations caused from the variations in the scaling factor in the main scanning direction, appropriate methods have been suggested. By means of one method example, positions of mirrors provided in a print head are changed so that an exposure distance is also changed and, as a result, the scaling factor is controlled. As another method example, scaling correction is performed in the main scanning direction by modulating laser clocks that are used for exposure. This method is disclosed in Japanese Laid-Open Patent Application No. 63-64473, for example.

For color deviations caused from skews in the sub-scanning direction that are different for each color, specific methods have been practically used. Specifically, using one of the methods, the image formation positions are mechanically corrected by actually adjusting inclination of an image forming unit, or a photosensitive drum in particular, for each color. Using another one of the methods, the relative deviation between two points is detected in the main scanning direction, and in accordance with the detection result, the mirrors in the print head are moved so that the image formation positions are corrected.

However, using the method of changing the positions of the mirrors to avoid the color deviations caused from the variations in the scaling factor in the main scanning direction, the construction of the image forming apparatus increases in complexity and is also subject to adverse affects of mechanical vibrations or the like. For this reason, greater rigidity should be provided for the apparatus to withstand vibrations. This results in increases in both size and costs for manufacturing the image forming apparatuses. When using the method of correcting the scaling factor in the main scanning direction through modulating the laser clocks, the modulation should be performed at a high speed. Thus, a CPU with a high processing speed needs to be used, and therefore, costs would be increased. Here, using either of these methods, it is difficult to change the amount of adjustment in one scanning line in terms of stability.

Meanwhile, using the method of actually adjusting the inclination of the photosensitive drums to avoid the skews in the sub-scanning direction, the adjustments need to be performed when the photosensitive drums are replaced. Therefore, it is difficult to automate the adjustments. By means of the method of moving the mirrors in the print head, the apparatus becomes subject to mechanical vibrations, and therefore, the apparatus needs to be increased in size. Here, using either of these methods, it is impossible to avoid the color deviations caused from the bows even though possible to avoid the color deviations caused from the skews.

SUMMARY OF THE INVENTION

The object of the present invention is to provide an image forming apparatus that accurately correct color deviations caused from various factors and that forms high quality images.

The object of the present invention can be achieved by an image forming apparatus which includes an image writing unit and forms an image on an image carrier that is being transported using the image writing unit, the image forming apparatus made up of: a controller which controls the image writing unit to form a registration mark at not less than two different positions in a main scanning direction perpendicular to a transporting direction in which the image carrier is transported; a detecting unit which detects each registration mark formed by the image writing unit; a deviation obtaining unit which obtains a deviation for each registration mark with respect to a reference position, in accordance with a detection result given by the detecting unit; a function formulating unit which formulates a correction approximation function from the deviations obtained by the deviation obtaining unit, the correction approximation function being used for determining image writing positions for pixels of an image; and a writing operation correcting unit controls the image writing unit to perform an image writing operation so as to reduce a deviation of a formed image in accordance with the correction approximation function.

With this construction, at least two registration marks are formed at different positions in the main scanning direction, and a correction approximation function is formulated from the deviations detected for the registration marks. By means of the correction approximation function, deviations occurring to positions, aside from the positions where the registration marks are formed, can be also estimated. Thus, especially when the correction approximation function has a degree that is at least two, color deviations caused from various factors, such as skews, bows, and variations in the scaling factor, can be prevented. This enables the image forming apparatus of the present invention to form high quality images.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF PREFERRED EMBODIMENTS

The following is a description of embodiments of the image forming apparatus of the present invention, with reference to the drawings. In these embodiments, a tandem-type digital color copier (simply referred to as the "copier" hereinafter) is used as an example of such an image forming apparatus.

First Embodiment (1) Construction of the Copier

Figure 1:
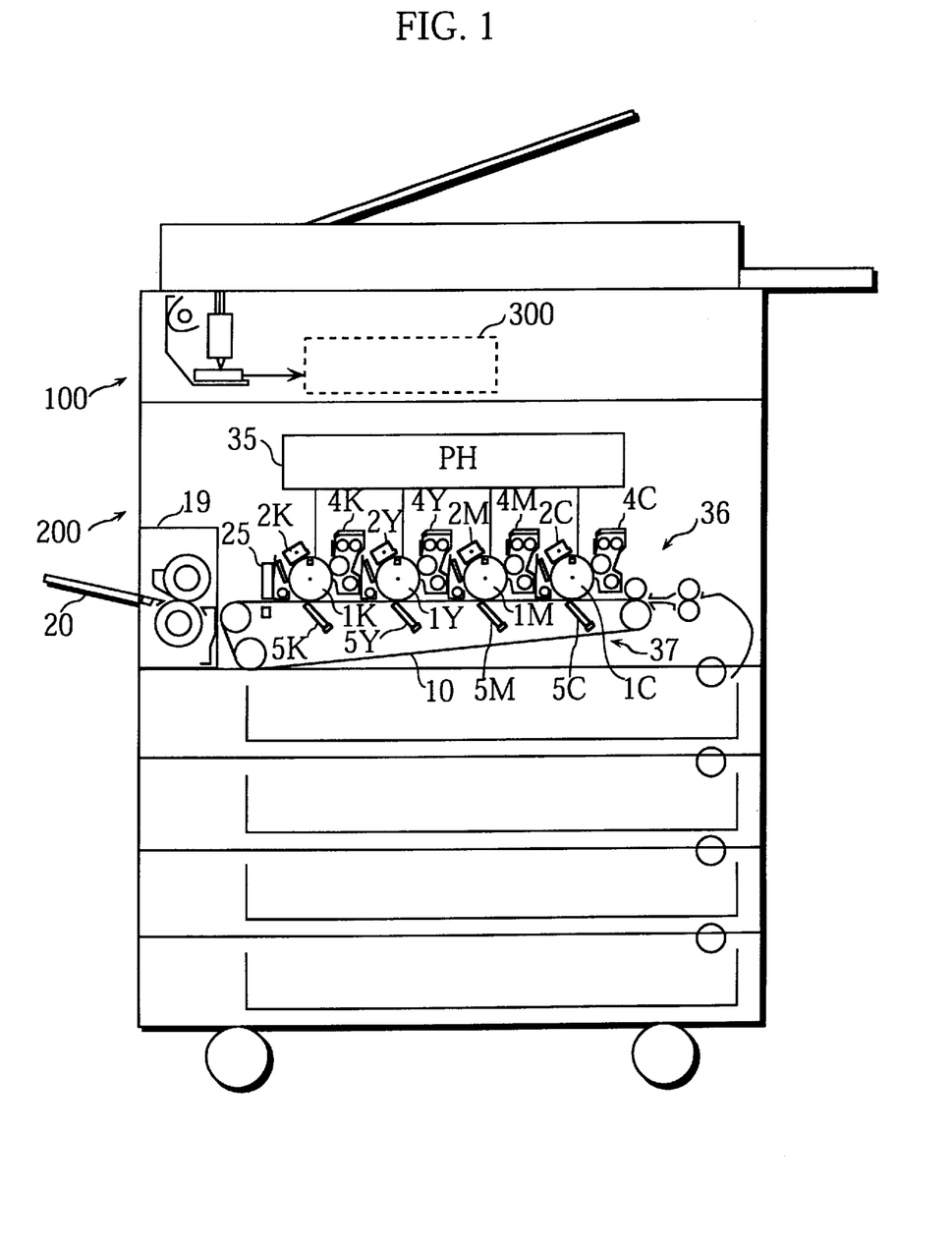
FIG. 1 is a schematic sectional view of a digital color copier of an embodiment of the present invention.

FIG. 1 is a schematic sectional view of the copier of the present embodiment. The copier has four image forming units set in line above a transfer belt along its length and forms a color image by transferring images formed by the image forming units onto a recording sheet.

As shown in FIG. 1, the copier is composed of an image reading unit 100 and a printing unit 200. The image reading unit 100 reads an image of a document and the printing unit 200 reproduces the image read by the image reading unit 100 on a recording sheet by printing. These two units are controlled by a control unit 300.

The image reading unit 100 is a well-known device that reads an image of a document set on a platen glass (not illustrated) and obtains multivalued digital signals for red (R), green (G), and blue (B). The obtained multivalued digital signals are next converted into 8-bit gradation data for C, M, Y, and K in the control unit 300. The control unit 300 performs various processes, such as a color correction process, on the gradation data so as to improve reproducibility of the read image.

The printing unit 200 includes a print head unit (referred to as the "PH" hereinafter) 35, an image forming system 36, and a transporting system 37. In the printing unit 200, laser diodes (not illustrated) provided in the PH 35 for C, M, Y, and K are driven to respectively emit laser beams in accordance with signals outputted from the control unit 300. These laser beams are respectively scanned on surfaces of photosensitive drums 1C to 1K that are provided for the image forming system 36. During the scanning process, the photosensitive drums 1C to 1K are rotationally driven.

The photosensitive drums 1C to 1K are uniformly charged by sensitizing chargers 2C to 2K before being exposed to the laser beams. By means of the exposure, electrostatic latent images are formed on the surfaces of the photosensitive drums 1C to 1K. The electrostatic latent images are developed into visible toner images by corresponding developing units 4C to 4K. The developing units 4C to 4K respectively supply the photosensitive drums 1C to 1K with C, M, Y, and K toners as developers. With application of electric fields of transfer brushes 5C to 5K, the toner images formed on the surfaces of the photosensitive drums 1C to 1K are sequentially transferred onto a recording sheet which is transported on a transfer belt 10. Here, the toner images are superimposed on the recording sheet to form a color image.

After the image transfer, the recording sheet is separated from the transfer belt 10 and brought into a fixing unit 19, where toner particles on the recording sheet are fused and fixed in place. Finally, the recording sheet is discharged onto a discharge tray 20. Note that the transfer belt 10 is made of transparent material, such as polyethylene terephthalate (PET).

Three optical sensors 25s, 25c, and 25e are set behind the image forming unit used for forming a black image. In the present embodiment, these optical sensors are aligned in the main scanning direction, providing a same distance between the neighboring sensors. Hereinafter, these three optical sensors may be considered as one set and referred to as the "optical sensor unit 25." Note that the subscripts s, c, and e of the optical sensors 25s, 25c, and 25e respectively indicates "start", "center", and "end". Using values detected by the optical sensor unit 25, registration correction is performed. As the optical sensor unit 25, a transmission-type optical sensor is used. For the optical sensor unit 25 used in the present embodiment, an LED is provided as a light emitter and a photodiode (PD) is provided as a light receiver.

A CCD may be used as the light receiver. If the transfer belt 10 is made of opaque material, a reflection-type sensor may be used as the optical sensor unit 25. The registration correction performed using the optical sensor unit 25 is described in detail later in this specification.

(2) Construction of the Control Unit 300

Figure 2:
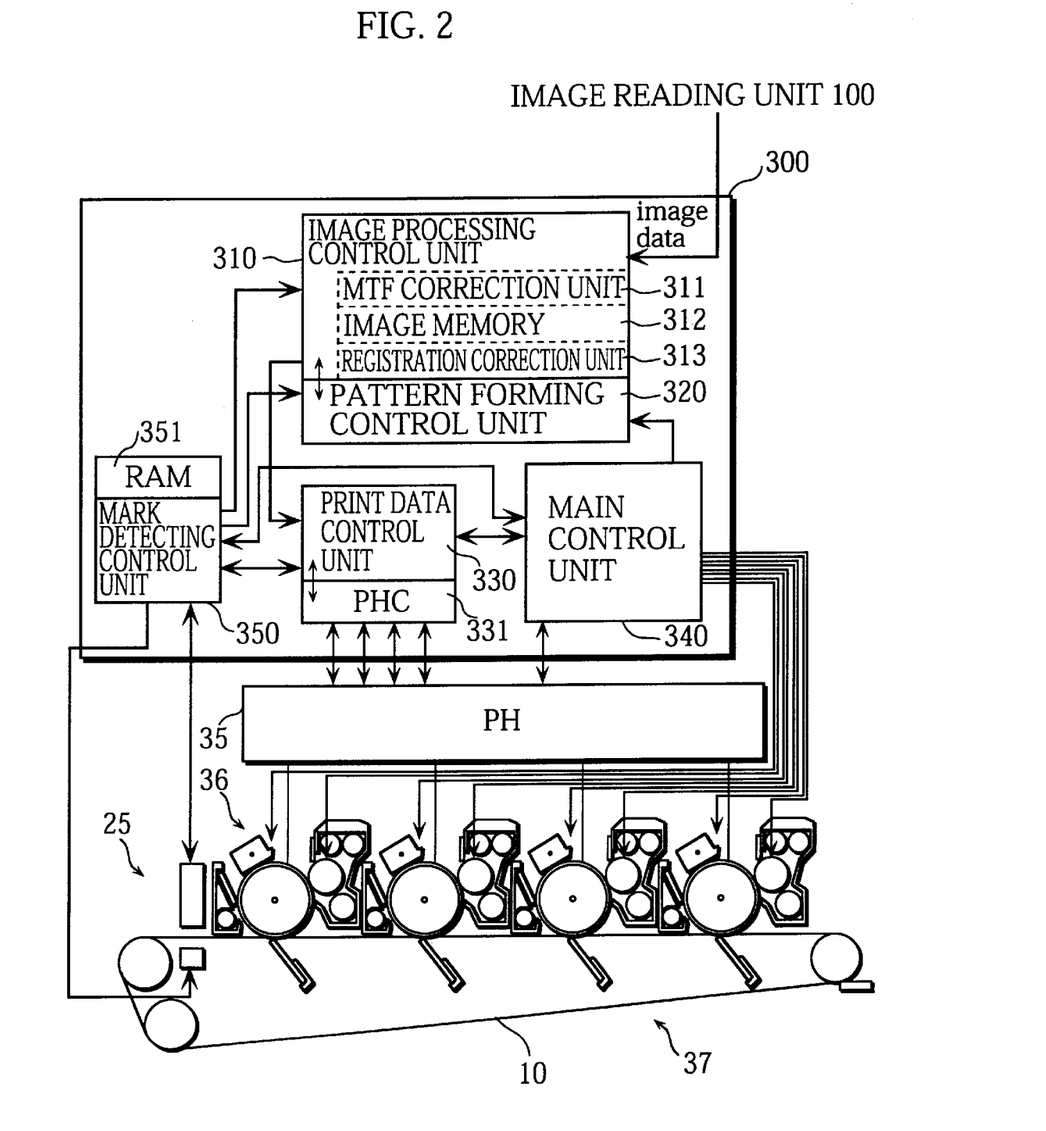
FIG. 2 is a functional block diagram of a control unit provided in the digital color copier.

The construction of the control unit 300 is described, with reference to the functional block diagram shown in FIG. 2.

As shown in FIG. 2, the control unit 300 includes an image processing control unit 310, a pattern forming control unit 320, a print data control unit 330, a main control unit 340, and a mark detecting control unit 350. Each of these control units 310 to 350 is provided with a CPU for serving as the main component, a ROM for storing control programs and various initial data, and a RAM for temporarily storing control variables.

The image processing control unit 310 includes an MTF correction unit 311, an image memory 312, and a registration correction unit 313.

The image data for R, G, and B obtained by the image reading unit 100 is inputted into the image processing control unit 310. The image processing control unit 310 performs an A/D conversion process and shading correction process on the image data, and then converts the image data into density data for each of the reproduction colors C, M, Y and K. Then, the MTF correction unit 311 performs the well-known data processes, such as an edge emphasis process and smoothing process, on the density data to improve an image quality. After this, the density data is stored into the image memory 312 for each reproduction color.

The print data control unit 330 controls the PH 35 to be driven via a PH control unit (PHC) 331 in accordance with print data outputted from the image processing control unit 310. As a result, the laser beams for C, M, Y, and K are emitted to respectively scan the surfaces of the photosensitive drums 1C to 1K.

The pattern forming control unit 320 generates print data used for forming registration marks when the registration correction is to be performed. Then, the image processing control unit 310 transmits the print data to the print data control unit 330 at a predetermined timing. Receiving the print data, the print data control unit 330 has a registration mark formed for each color on the surface of the transfer belt 10, via the PHC 331.

The mark detecting control unit 350 controls ON/OFF operations of the optical sensors 25s, 25c, and 25e as well as sampling detection signals of the registration marks at regular intervals. The mark detecting control unit 350 obtains sample values by performing the A/D conversion process on the sample detection signals, and then temporarily stores the sample values into the RAM 351. The mark detecting control unit 350 further obtains the central position (or, peak position) of each waveform formed from the sample values. The obtained peak position is determined as the correct position of a line forming a corresponding registration mark, and is transmitted as mark position information to the image processing control unit 310.

In accordance with the mark position information, the registration correction unit 313 of the image processing control unit 310 calculates relative deviations among the registration marks, and corrects addresses of the image data stored in the image memory 312 for each color in accordance with the calculated deviations. The copier of the present invention employs a certain method of correcting the addresses of the image data, and this method is explained in detail later in this specification. In accordance with the image data the addresses of which have been corrected, the print data control unit 330 forms an image via the PHC 331.

The main control unit 340 controls respective operation timings of the print data control unit 330, the image reading unit 100, the PH 35, and the transporting system 37, so that a smooth image forming operation is executed.

Next, the shape of the registration marks and an operation performed for detecting the positions of the registration marks are explained.

Receiving an instruction from the main control unit 340 to perform the registration correction, the pattern forming control unit 320 reads the print data of the registration marks from its ROM and transmits the print data to the print data control unit 330. In accordance with the print data, the print data control unit 330 forms the registration mark on the transfer belt 10 for each color at a predetermined timing, in collaboration with the PH 35 and the image forming system 36.

Figure 3:
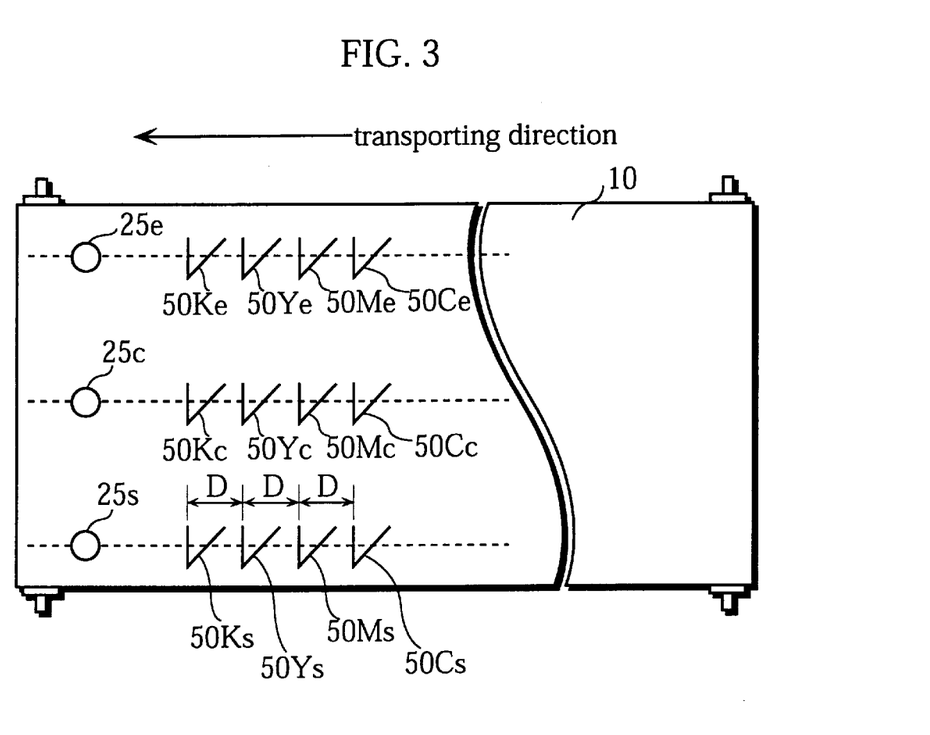
FIG. 3 shows an example of registration marks formed on a transfer belt.

FIG. 3 shows an example of the registration marks formed on the transfer belt 10. In the present embodiment, registration marks 50Cs to 50Ks, 50Cc to 50Kc, and 50Ce to 50Ke are formed in the same shape, and are V-shaped as shown in FIG. 3. Each of the V-shaped registration marks is composed of a CD line making a right angle with the transporting direction when no deviation is detected and a sloped line forming a 45° angle with the CD line. When the image forming positions on the photosensitive drums 1C to 1K are correct and transfer positions are also correct, this means that no color deviations occur. In this case, supposing that the registration marks 50Cs to 50Ks, 50Cc to 50Kc, or 50Ce to 50Ke are considered as one set, the central point of a set in the direction perpendicular to the transporting direction (i.e. the main scanning direction) comes to a detecting position of the corresponding optical sensor 25s, 25c, or 25e. For convenience of explanation, each detecting position of the optical sensors 25s, 25c, and 25e is indicated by a dotted line in FIG. 3. The registration marks of each set are formed on the dotted line as shown in FIG. 3. Also, the CD lines are formed with a distance D between them in the transporting direction.

As the transfer belt 10 moves, the registration marks are sequentially detected by the optical sensor unit 25 at predetermined sampling intervals. The sample detection signals are transmitted to the mark detecting control unit 350. The mark detecting control unit 350 obtains sample values by performing the A/D conversion process on the sample detection signals, and then temporarily stores the sample values into the RAM 351. Subsequently, the mark detecting control unit 350 obtains the peak position of each waveform formed from the sample values.

The peak position is obtained for each line (CD and slope lines) of the registration marks as follows. A sample waveform is first obtained from interpolation data between the sample points. Then, an area enclosed in the waveform is integrated from both sides and, when two areas are equal to each other in size, the boundary of these two areas is determined as the peak position of the current registration mark.

Figure 4:
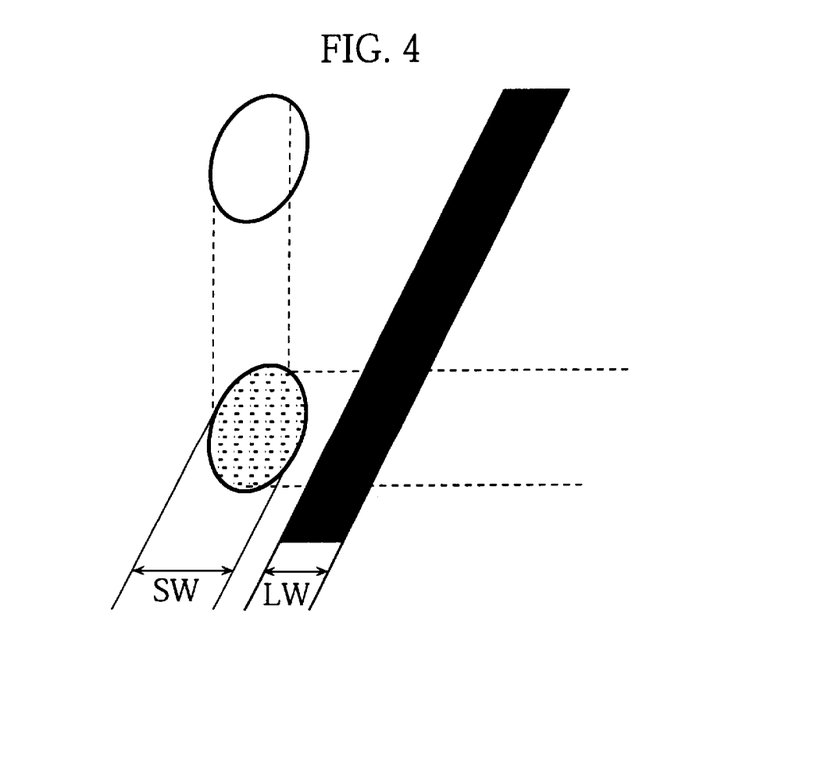
FIG. 4 is a drawing to help explain a relation in a detecting direction between a detection width of an optical sensor and a width of a line forming a registration mark.

In the present embodiment, a relation between a line width LW of a registration mark and a detection width (an aperture width) SW of an optical sensor is set in conformity with certain conditions. This enables intermediate points between the actually sampled points to be easily interpolated to form a sample waveform. FIG. 4 is a drawing to help explain the relation between the line width LW and the detection width SW.

Figure 5:
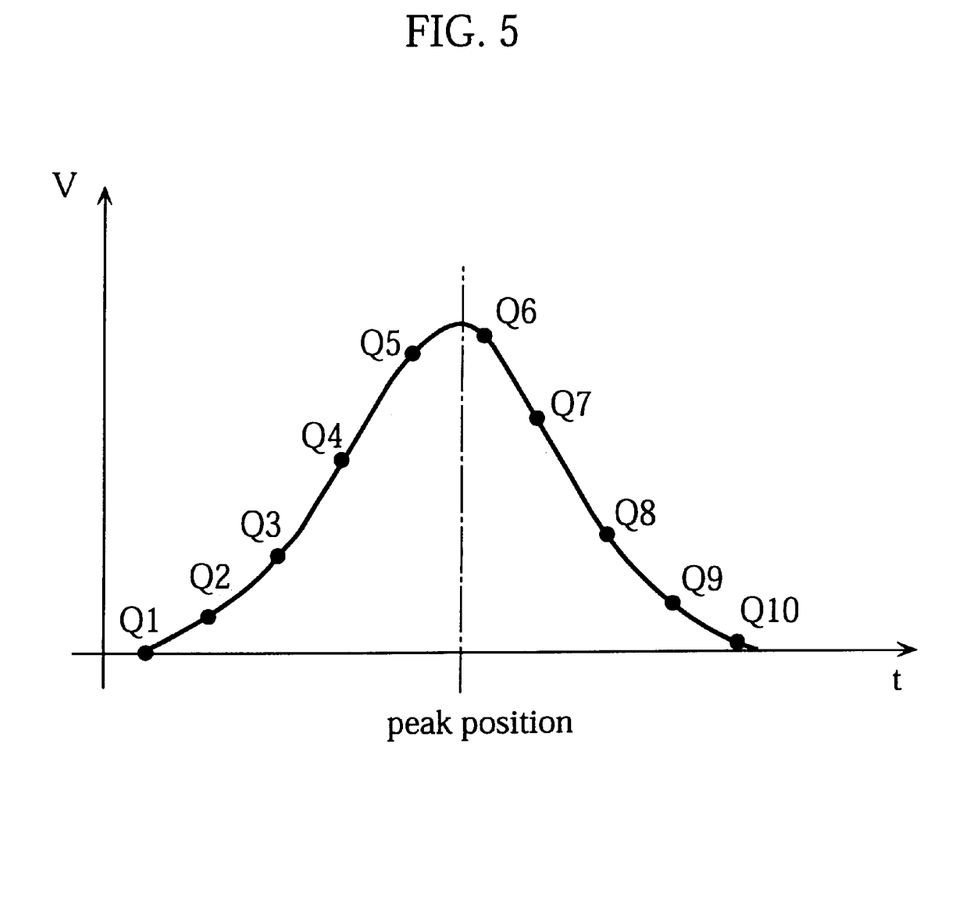
FIG. 5 shows an example of a sample waveform of a registration mark.

FIG. 5 shows an example of a sample waveform obtained in the present embodiment. As shown in FIG. 5, starting from a minimum value to a peak value and then to the minimum value again, the waveform is formed by a mountainous line and one half of the waveform is almost the mirror image of the other. Points Q1 to Q10 are examples of sample points.

When the waveform is formed by such a mountainous line as shown in FIG. 5, where values of the points Q1 to Q10 smoothly change, there are not remarkable changes between the sample points. Such a waveform allows interpolation of the intermediate points to be easily performed with high precision. A smooth waveform like this can be obtained by setting the detection width SW relatively wider than the line width LW, as shown in FIG. 4.

The mark detecting control unit 350 transmits data, which is obtained in the stated way, regarding the CD and slope lines of each registration mark to the registration correction unit 313.

(3) Control Operation for Registration Correction

The following is a description of a control operation performed for the registration correction of the copier having the stated construction.

Figure 6:
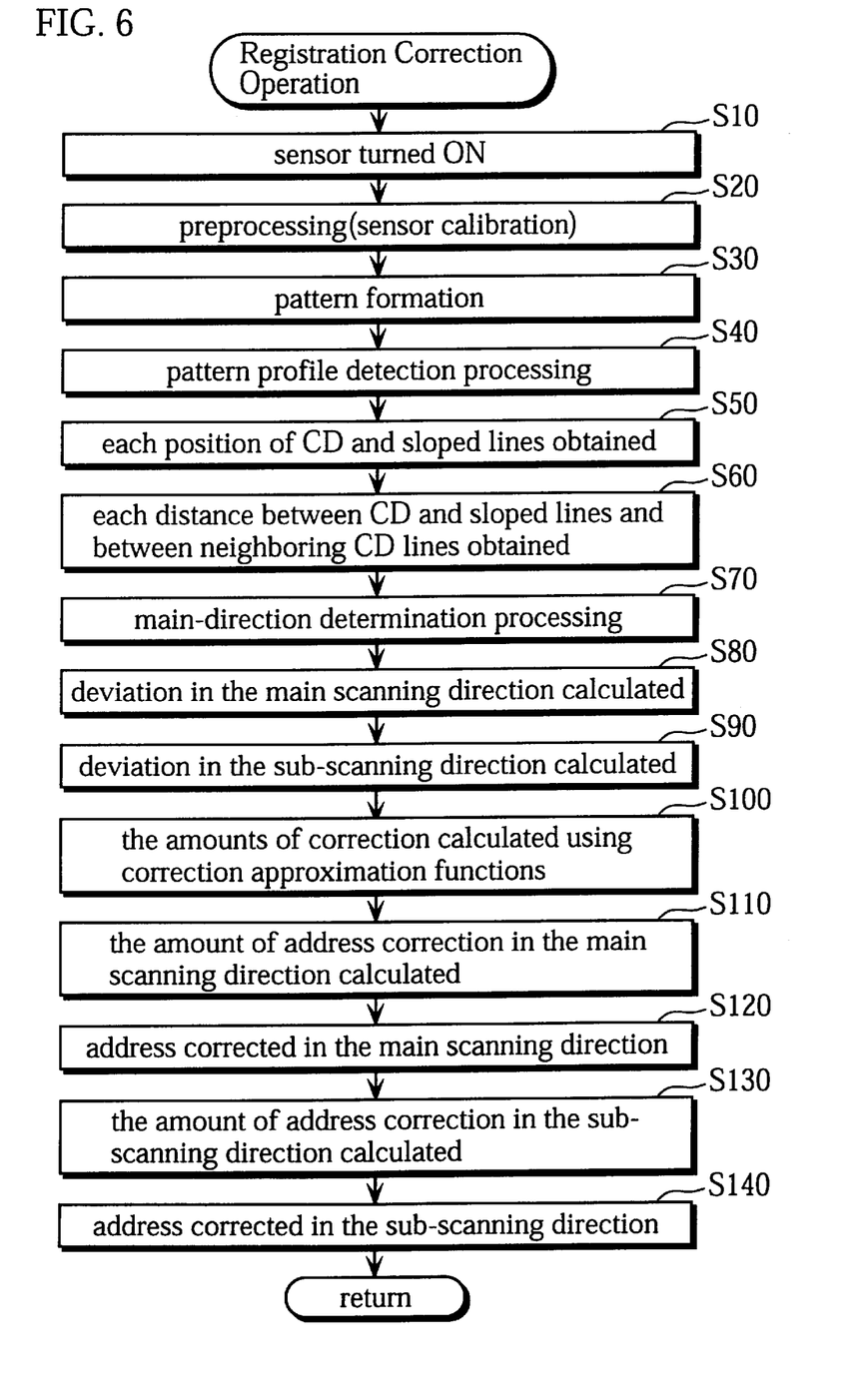
FIG. 6 is a flowchart showing a control operation performed for registration correction.

FIG. 6 is a flowchart showing the control operation for the registration correction. The registration correction is so programmed that it is performed at a given time. It maybe performed when the copier is turned on or after a predetermined number of copies have been made.

First, the optical sensor unit 25 is turned on by the mark detecting control unit 350 (step S10). Then, preprocessing is performed for calibration of outputs of the optical sensor unit 25 (step S20). More specifically, the light source (LED) of the optical sensor unit 25 is extinguished and the output value at this moment is calibrated to a value to be detected at a level of "0".

Next, the mark detecting control unit 350 has the light source project a predetermined amount of light. The light passes through the transparent transfer belt 10 and is received by the light receiver, which then outputs the received amount of light as an output value to the mark detecting control unit 350. The mark detecting control unit 350 receives the output value as a value detected as a surface level and calibrates the output value to a value to be detected at a maximum level. These calibration values at the "0" and maximum levels are stored in the RAM 351. From then on, detection values of the optical sensor unit 25 are calibrated according to the stated calibration values.

After the preprocessing is completed, the registration marks for C, M, Y, and K are formed on the surface of the transfer belt 10 (step S30). The registration marks for each color may be simply referred to as the "pattern" hereinafter. In this pattern formation processing, process conditions, such as a grid voltage and a bias voltage, are set in the main control unit 340. These conditions are set for each color so as to obtain an appropriate value of an image density. These conditions are obtained in advance and stored in the ROM of the main control unit 340.

Next, the mark detecting control unit 350 reads the print data of the pattern stored in the ROM of the print data control unit 330 and sets the print data into its line memory as the image data to be used for forming the pattern for each color. The mark detecting control unit 350 controls each operation performed by the components of the image forming units. Specifically, in collaboration with the main control unit 340, the mark detecting control unit 350 has the image forming system 36 and the transporting system 37 start their respective operations, such as rotationally driving the photosensitive drums 1C to 1K and transfer belt 10 and activating the developing units 4C to 4K.

Subsequently, in accordance with the print data of the pattern, the photosensitive drums 1C to 1K are exposed at respective predetermined timings by the PH 35. As a result, electrostatic latent images of the registration marks are formed on the surfaces of the photosensitive drums 1C to 1K. The electrostatic latent images are developed into toner images by the developing units 4C to 4K, and then the toner images are transferred onto the transfer belt 10. Here, the pattern formation processing is completed.

After the pattern formation processing, the mark detecting control unit 350 proceeds to pattern profile detection processing (step S40). In this step S40, the detection signals of the optical sensor unit 25 are corrected and a sample waveform is detected for each registration mark. Hereinafter, a sample waveform obtained after the correction of the detection signals may be referred to as the "pattern profile." First, at regular intervals, the optical sensor unit 25 detects a toner density of an image formed on the surface of the transfer belt 10. Each detected density is converted into a digital value.

As one example, the registration marks 50Cs to 50Ks are formed so that their central points in the main scanning direction come to the detecting position of the optical sensor 25s, as shown in FIG. 3. When the registration marks 50Cs to 50Ks sequentially pass directly under the optical sensor 25s, the toner density detected on the surface of the transfer belt 10 accordingly changes. As a result, the positions of the CD and sloped lines are detected for each of the registration marks 50Cs to 50Ks. The registration marks 50Cc to 50Kc and 50Ce to 50Ke are also detected in the same way.

Next, amplification correction is executed. Specifically, each detection value of the registration marks is corrected through amplification using a predetermined output amplification factor.

Then, high frequency noise elimination processing is performed on the detection signal using a lowpass filter or the like. The result is stored in the RAM 351, and a pattern profile as shown in FIG. 5 is generated.

Accordingly, sampling of the density values of the registration marks formed on the transfer belt 10 is terminated. From the sampling result, the peak position of the sample waveform is obtained as the position information of the CD or sloped line of the corresponding registration mark (step S50).

As described above, intermediate points between the sample points each having a value equal to or greater than a predetermined value are first calculated, so that a sample waveform is obtained. Then, an area enclosed in the waveform is integrated from both sides and, when two areas are equal to each other in size, the boundary of these two areas is determined as the peak position of the CD or sloped line of the corresponding registration mark.

In the present embodiment, the relation between the detection width SW and the line width LW is appropriately set so that an ideal waveform having a peak as shown in FIG. 5 can be obtained. Thus, an optimum sample waveform is obtained for each CD and sloped line and, as a result, its peak position is reliably detected.

After the positions of the CD and sloped lines are detected for each registration mark, a distance between the CD line and the sloped line and a distance between the neighboring CD lines are calculated (step S60). The former distance is calculated by multiplying a period of time taken from the detection of the CD line to the detection of the sloped line by a moving speed of the transfer belt 10. The latter distance is calculated by multiplying a period of time taken from the detection of a CD line to the detection of the next CD line by the moving speed of the transfer belt 10.

After this, processing is performed to determine the positions of the registration marks in the main scanning direction (step S70). This processing is referred to as the main-direction determination processing hereinafter. Specifically, in this processing, a distance between the CD and sloped lines of each of the registration marks 50Ks, 50Kc, and 50Ke is set as the reference distance in the main scanning direction.

Figure 7:
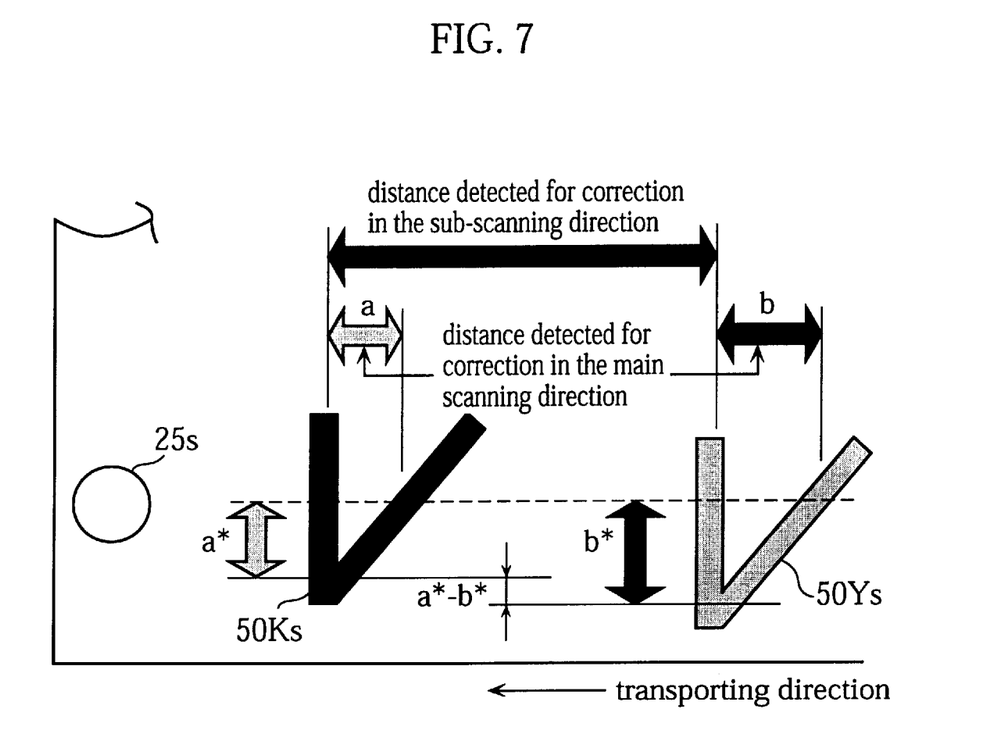
FIG. 7 is a drawing to help explain how the deviations are calculated in the main scanning and sub-scanning directions in accordance with the detected positions of the registration marks.

The main-direction determination processing is explained in detail as follows, with reference to FIG. 7. FIG. 7 is an enlarged view showing an area where the registration marks 50Ks and 50Ys are formed. A distance between the detecting position that is represented by the dotted line and the intersection of the CD and sloped lines of the registration mark 50Ks is referred to as A*. A distance between the detecting position and the intersection of the CD and sloped lines of the registration mark 50Ys is referred to as B*. In this case, a relative deviation between the registration marks 50Ks and 50Ys in the main scanning direction is obtained by calculating (A*−B*).

Since the CD line and the sloped line of each registration mark intersect at a 45° angle, the distances A* and B* are respectively equal to distances A and B between the CD and sloped lines of the registration mark 50Ks and 50Ys that are measured on the detecting position. This means a difference obtained by calculating (A*−B*) is equal to a difference obtained by calculating (A−B). Therefore, the relative deviation among the registration marks in the main scanning direction is obtained by calculating a difference of the distances between the CD and sloped lines that are measured on the detecting position. By setting the distance A between the CD and sloped lines of the registration mark 50Ks as the reference distance, the deviation of the other registration marks 50Cs, 50Ms, and 50Ys with respect to the registration mark 50Ks can be calculated. Similarly, the distance between the CD and sloped lines of the registration mark 50Kc is used as the reference distance for the registration marks 50Cc, 50Mc, and 50Yc. Also, the distance between the CD and sloped lines of the registration mark 50Ke is used as the reference distance for the registration marks 50Ce, 50Me, and 50Ye. On this account, the distance between the CD and sloped lines is obtained for each of the registration marks 50Ks, 50Kc, and 50Ke in the main-direction determination processing.

Then, the deviation in the main scanning direction is calculated (step S80). Each deviation of the registration marks 50Cs, 50Ms, and 50Ys with respect to the registration mark 50Ks in the main scanning direction is obtained as described above. That is, the deviation is obtained by calculating a difference between the distance from the CD line to the sloped line of the registration mark 50Ks and the corresponding distance of the registration mark 50Cs, 50Ms, or 50Ys. As indicated above, this processing is performed in the same way for the registration marks 50Cc to 50Yc, and 50Ce to 50Ye.

Next, the deviation in the sub-scanning direction is calculated (step S90). As stated above, each set of the registration marks 50Cs to 50Ks, 50Cc to 50Kc, and 50Ce to 50Ke is formed, with the distance D being left between the neighboring CD lines when there are no color deviations. Note that the distance D refers to a distance measured between two CD lines adjacent each other in the sub-scanning direction. If the registration marks are deviated from each other, the distance would not be D. The deviation is obtained as a difference between the distance D and an actually measured distance. In the present embodiment, this difference is calculated as the deviation in the sub-scanning direction.

Accordingly, each deviation of the registration marks 50Cs to 50Ys, 50Cc to 50Yc, and 50Ce to 50Ye with respect to the corresponding registration marks 50Ks, 50Kc, and 50Ke is obtained in the main scanning direction. Also, the deviation among the registration marks of each set in the sub-scanning direction is obtained, with the distance D being set as the reference distance. From these deviations, correction approximation functions are obtained. Then, the amounts of correction are respectively obtained in the main scanning and sub-scanning directions using the obtained correction approximation functions (step S100).

Figure 8:
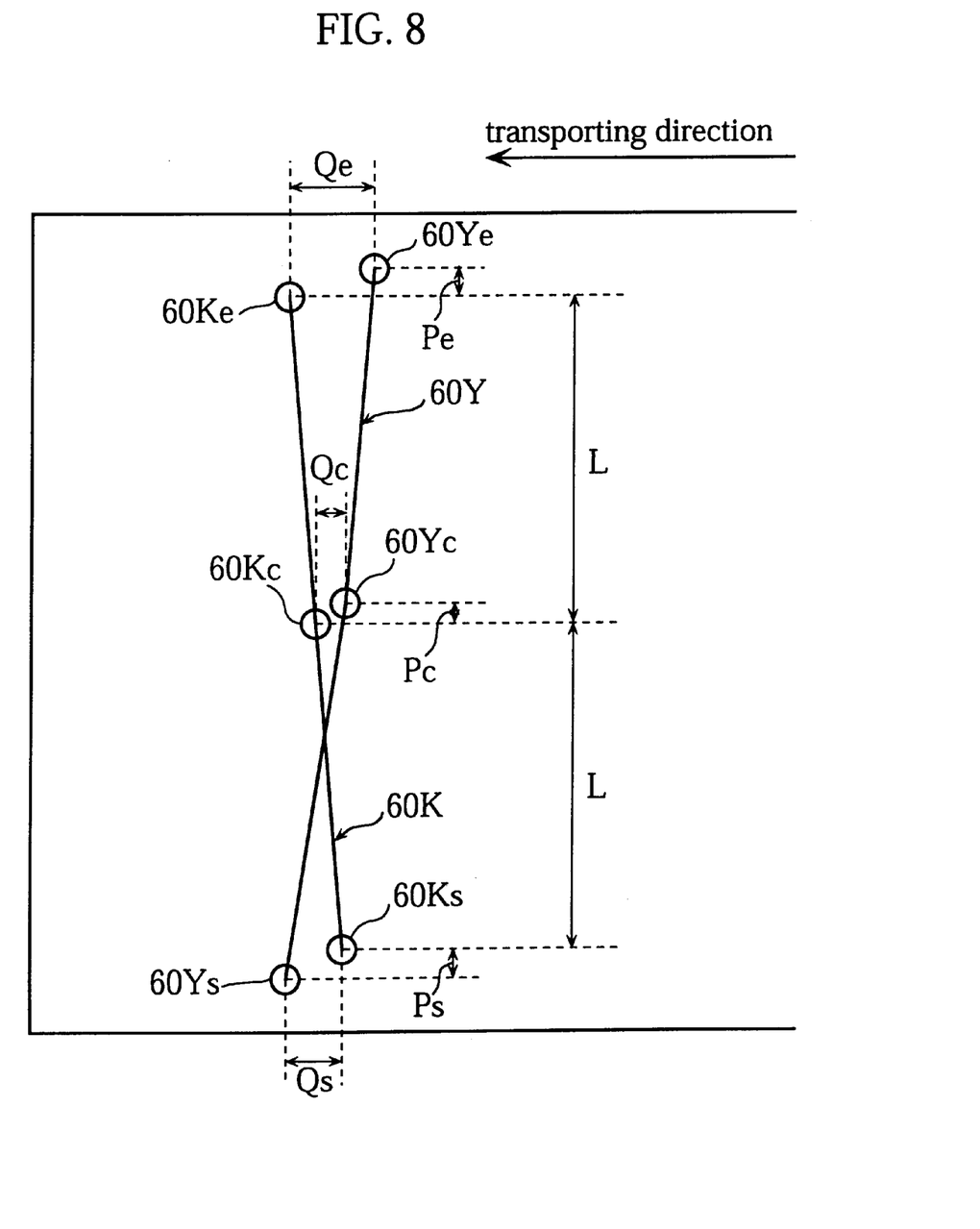
FIG. 8 is a drawing to help explain how a correction approximation function is obtained.

FIG. 8 is a drawing to help explain how the correction approximation functions are obtained and how the amounts of correction are calculated using the obtained correction approximation functions. As shown in FIG. 8, a line formed by connecting three dots 60Ks, 60Kc, and 60Ke is not parallel to the main scanning direction. This indicates that there is a factor that is responsible for a skew occurred to the photosensitive drum 1K.

It should be noted here that the skew on the photosensitive drum 1K can be corrected through address correction so that the linearity is ensured. In the present embodiment, however, the image forming position on the photosensitive drum 1K is used as a reference. Therefore, the skew on the photosensitive drum 1K is kept as it is. With respect to the detection result of the photosensitive drum 1K, the amount of correction is calculated for each of the other reproduction colors C, M, and Y. By correcting the deviations for these three reproduction colors, images formed on the surfaces of the photosensitive drums 1C to 1Y would have the same skew as found on the photosensitive drum 1K. Consequently, when the images are superimposed after the correction, the color deviation does not manifest itself.

In FIG. 8, yellow registration marks 60Ys, 60Yc, and 60Ye are respectively detected by the optical sensors 25s, 25c, and 25e. The deviations of 60Ys to 60Ye in the main scanning direction with respect to the reference registration marks, namely 60Ks to 60Ke, are represented by Ps, Pc, and Pe. Meanwhile, Qs, Qc, and Qe respectively represent the deviations of 60Ys, 60Yc, and 60Ye in the sub-scanning direction. In the present embodiment, calculation of the deviations in the main scanning and sub-scanning directions is explained only for yellow registration marks with respect to the black reference marks. Note that the calculation is executed in the same way for the other two reproduction colors cyan and magenta.

As stated above, the correction approximation functions are first obtained to calculate the deviation in the main scanning and sub-scanning directions in the present embodiment. The correction approximation functions are obtained as follows.

First, suppose that a distance between two pixels associated with the image forming positions of the registration marks 60Ks and 60Kc before correction is referred to as L. The distance L indicates a distance between addresses of the two pixels in the main scanning direction. In the present embodiment, the optical sensors 25s, 25c, and 25e are set with the same distance in between. As such, a distance between two pixels associated with the image forming positions of the registration marks 60Kc and 60Ke before correction is equal to the distance L.

Suppose that an address of a target yellow pixel in the main scanning direction is x and that the amount of correction to be made for the pixel to eliminate the deviation with respect to a black reference pixel is expressed as (ΔX, ΔY). The amount of correction (ΔX, ΔY) is approximated using the following quadratic functions.

$\Delta X = a_1 x^2 + b_1 x + c_1$ $\Delta Y = a_2 x^2 + b_2 x + c_2$

The deviations Ps, Pc, and Pe, and Qs, Qc, and Qe that are obtained as described above are considered as the amounts of correction to be respectively made in the main scanning and sub-scanning directions. Substitution of these amounts of correction into the above quadratic functions yields the simultaneous equations shown below as Equations 1. The addresses of the registration marks 60Ys, 60Yc, 60Ye, 60Ks, 60Kc, and 60Ke are shown as follows.

60Ys: $(X_{YS}, Y_{YS})$, 60Yc: $(X_{YC}, Y_{YC})$, 60Ye: $(X_{YE}, Y_{YE})$
60Ks: $(X_{KS}, Y_{KS})$, 60Kc: $(X_{KC}, Y_{KC})$, 60Ke: $(X_{KE}, Y_{KE})$

Each deviation of the registration marks in the main scanning and sub-scanning directions is expressed by the corresponding one of the following Equations 1.

$$Ps = a_1 X_{YS}^2 + b_1 X_{YS} + c_1$$
$$Pc = a_1 X_{YC}^2 + b_1 X_{YC} + c_1$$
$$Pe = a_1 X_{YE}^2 + b_1 X_{YE} + c_1$$
$$Qs = a_2 X_{YS}^2 + b_2 X_{YS} + c_2$$
$$Qc = a_2 X_{YC}^2 + b_2 X_{YC} + c_2$$
$$Qe = a_1 X_{YE}^2 + b_2 X_{YE} + c_2 \qquad \text{[Equations 1]}$$

As described above, the distance between the two pixels associated with the image forming positions of the registration marks 60Ks and 60Kc or 60Kc and 60Ke before correction is referred to as L that is measured in the main scanning direction. This distance L refers to a distance between the two addresses. Therefore, a distance between two pixels associated with the image forming positions of the registration marks 60Ys and 60Yc, or 60Yc and 60Ye, is also considered as L. Thus, the relations expressed in the following Equations 2 can be established.

$$X_{KC} - X_{KS} = L$$
$$X_{KE} - X_{KC} = L$$
$$X_{KE} - X_{KS} = 2L$$
$$X_{YC} - X_{YS} = L$$
$$X_{YE} - X_{YC} = L$$
$$X_{YE} - X_{YS} = 2L \qquad \text{[Equations 2]}$$

From Equations 1 and 2, the relations expressed in the following equations 3 are drawn.

$$Pc - Ps = a_1 L(X_{YC} + X_{YS}) + b_1 L$$
$$Pe - Pc = a_1 L(X_{YE} + X_{YC}) + b_1 L$$
$$Pe - Ps = 2a_1 L(X_{YE} + X_{YS}) + 2b_1 L$$
$$Qc - Qs = a_2 L(X_{YC} + X_{YS}) + b_2 L$$
$$Qe - Qc = a_2 L(X_{YE} + X_{YC}) + b_2 L$$
$$Qe - Qs = 2a_2 L(X_{YE} + X_{YS}) + 2b_2 L \qquad \text{[Equations 3]}$$

Suppose that an address of a pixel having the deviation expressed as (Pc, Qc) is "0" in the main scanning direction. Thus, when the address of $X_{KS}$ in the main scanning direction is expressed as "–L", the following Equations 4 can be formulated.

$$X_{KC} - X_{KS} = -L$$
$$X_{KE} - X_{KC} = L$$
$$X_{KE} - X_{KS} = 0$$
$$X_{YC} - X_{YS} = -L$$
$$X_{YE} - X_{YC} = L$$
$$X_{YE} - X_{YS} = 0 \qquad \text{[Equations 4]}$$

Substitution of the relations expressed in the Equations 4 respectively into the Equations 3 yields the following Equations 5.

$$Pc - Ps = -a_1 L^2 + b_1 L$$
$$Pe - Pc = a_1 L^2 + b_1 L$$
$$Pe - Ps = 2b_1 L$$
$$Qc - Qs = -a_1 L^2 + b_2 L$$
$$Qe - Qc = a_1 L^2 + b_2 L$$
$$Qe - Qs = 2b_2 L \qquad \text{[Equations 5]}$$

The coefficients $a_1$, $b_1$, $c_1$, $a_2$, $b_2$, and $c_2$ are calculated from the Equations 5, and the following Equations 6 are derived. As stated above, the address of a pixel having the deviation expressed as (Pc, Qc) is "0" in the main scanning direction. Thus, the coefficients $c_1$ and $c_2$ respectively correspond to Pc and Qc.

$$a_1 = (Ps + Pe - 2Pc)/2L^2$$
$$b_1 = (Pe - Ps)/2L$$
$$c_1 = Pc$$
$$a_2 = (Qs + Qe - 2Qc)/2L^2$$
$$b_2 = (Qe - Qs)/2L$$
$$c_2 = Qc \qquad \text{[Equations 6]}$$

Consequently, the amounts of correction $\Delta X$ and $\Delta Y$ in the main scanning and sub-scanning directions are obtained for the target yellow pixel having the address of x in the main scanning direction. Specifically, these amounts of correction can be respectively calculated using Formulas ① and ② of Equations 7 shown below. It should be noted here that, in the present embodiment, the amount of correction is calculated, with the address of the central pixel in the main scanning direction being set as "0" (as is the case with the address of the pixel having the deviation expressed as (Pc, Qc)).

[Equations 7]

$$\Delta X \cong \frac{(Ps + Pe - 2Pc) \times X^2}{2L^2} + \frac{(Pe - Ps) \times X}{2L} + Pc \qquad \text{Formula①}$$

$$\Delta Y \cong \frac{(Qs + Qe - 2Qc) \times X^2}{2L^2} + \frac{(Qe - Qs) \times X}{2L} + Qc \qquad \text{Formula②}$$

In the present embodiment, the approximation equation of the quadratic function is used for calculating an address correction value. However, a linear function may be used. Alternatively, a third-degree or higher-degree function may be used.

As shown in the flowchart of FIG. 6, the amount of correction $\Delta X$ in the main scanning direction is approximated for each pixel according to Formula ①, and is converted into the corresponding amount of address correction to be made in the main scanning direction in the image memory 312 (step S110). Then, the image forming position is corrected in the main scanning direction by correcting the corresponding address stored in the image memory 312 in accordance with the amount of address correction (step S120).

The amount of correction ΔY in the sub-scanning direction that is calculated according to Formula ② is converted into the amount of address correction to be made in the sub-scanning direction in the image memory 312 (step S130). Then, the image forming position is corrected in the sub-scanning direction by correcting the corresponding address stored in the image memory 312 in accordance with the amount of address correction (step S140). In this way, the registration correction is terminated and the processing returns to the main routine (not shown) of the operation for the entire copier.

As having been described, the amounts of correction to be made in the main scanning and sub-scanning direction are calculated using the correction approximation functions. Color deviations caused from various factors can be prevented, in particular, using a second-degree function (a quadratic function) or a higher-degree function. In the present embodiment, the explanation has been given in a case where the quadratic function is used. In accordance with the calculated amount of correction, the registration correction is performed so that the image forming position is corrected for each reproduction color. As a result, the color deviation caused from various factors can be prevented in the image forming apparatus of the present invention.

Second Embodiment

In the first embodiment, the amount of correction calculated according to the correction approximation function is converted into the amount of address correction to be made in the image memory 312. In accordance with the amount of address correction, a pixel (or, a target pixel) is determined whether it is printed or not at the original position. Here, a target pixel refers to a pixel before correction. In the determining operation, a pixel is switched between on (printed) and off (not printed) in the first embodiment. In other words, correction is performed in units of pixels. According to this method, however, an image noise may occur. This is because pixels are switched between on and off at almost the same position in the main scanning direction over a plurality of scanning lines.

To avoid this problem, in the second embodiment, a target pixel is not simply switched between on and off when the image forming position is corrected for each reproduction color. To be more specific, when the forming position of each target pixel is corrected, density distribution processing is executed to realize correction in a unit that is smaller than one pixel. By means of this method, the image noise as stated above can be reduced.

Figure 9A:
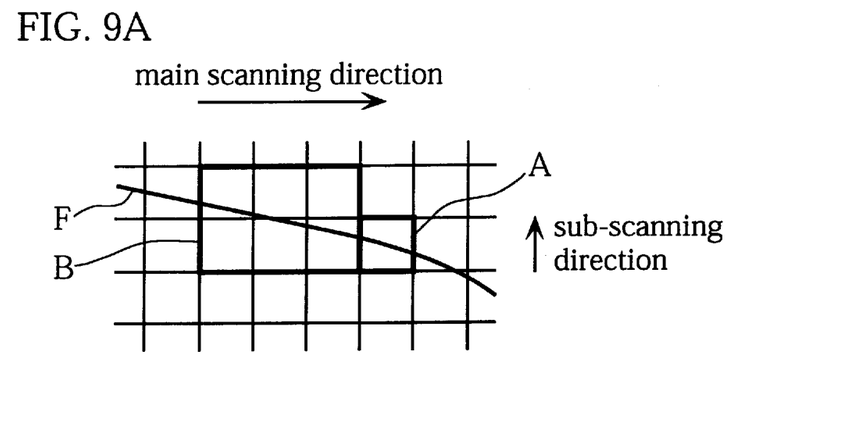
FIGS. 9A to 9C are drawings to help explain density distribution processing.
Figure 9B:
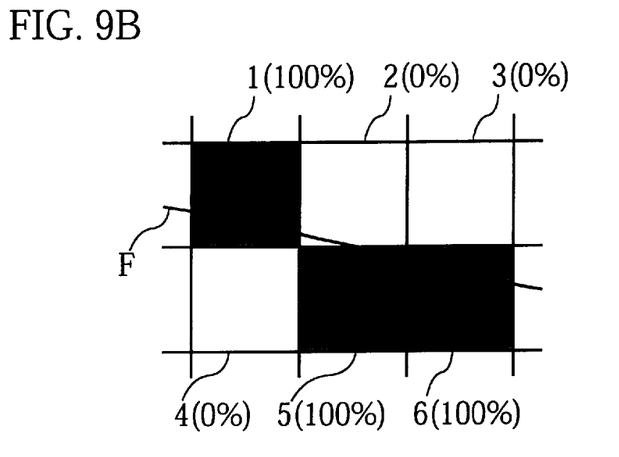
Figure 9C:
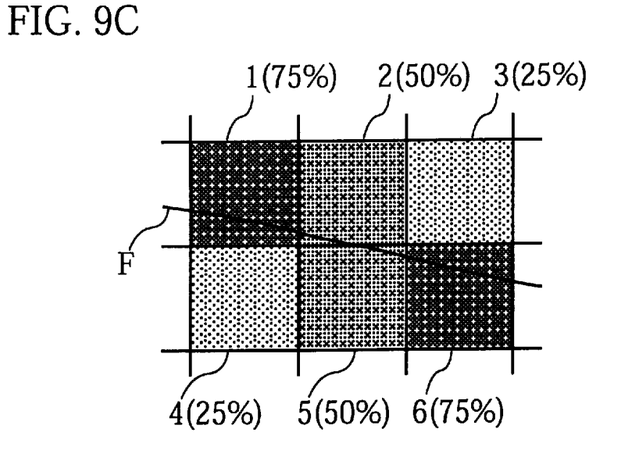

FIGS. 9A to 9C are drawings to help explain the density distribution processing of the present embodiment. As explained in the first embodiment, the amounts of correction in the main scanning and sub-scanning directions can be calculated according to Formulas ① and ② for the image forming apparatus of the present invention. However, a value obtained as (ΔX,ΔY) is not always calculated at an integer.

In the address correction performed in the first embodiment, pixels may be switched from on to off or vice versa when the fractional portion of the value obtained as the amount of correction according to the corresponding Formula exceeds a threshold. Meanwhile, in the present embodiment, the density distribution processing is performed in accordance with the fractional portion of the value obtained as the amount of correction.

FIG. 9A shows an example of a relation between a curve F representing the amount of correction obtained by the correction approximation function and pixels that are subjected to the correction. As shown in this figure, the curve F is passing through the central part of a pixel A. In this case, the density level of the pixel A before the correction is employed as it is.

Meanwhile, the curve F is passing through six pixels off centers (these pixels are referred to as "B" as one set in FIG. 9A). FIG. 9B is an enlarged view of the six pixels B shown in FIG. 9A. As shown in FIG. 9B, a tier appears at a position where the pixel is switched between on and off.

The tier can be made less obvious after the density distribution processing is performed, as shown in FIG. 9C. FIG. 9C is also an enlarged view of the six pixels B shown in FIG. 9A. Suppose that the fractional portion of the amount of correction ΔY in the sub-scanning direction is 0.75 or 0.25. In this case, as shown in FIG. 9C, the density is distributed between two pixels that are adjacent to each other in the sub-scanning direction, in accordance with the values of the fractional portions.

The density level of the target pixel is accordingly divided for two pixels adjacent each other in the sub-scanning direction. Since the density level is divided according to the values of the fractional portions, tiers can be prevented from clearly appearing as they do when a pixel is simply switched between on and off.

In the present embodiment where the density distribution processing is performed as described above, each pixel of an image to be formed after the correction becomes a focus of attention. The corresponding pixel before the correction is then detected, and the density level is determined for each pixel forming the image. To be more specific, inverse mapping coefficients in the main scanning and sub-scanning directions are obtained from the correction approximation functions. The corresponding pixel before the correction is determined according to the inverse mapping coefficients. Then, the density level of the pixel after the correction is determined through distribution or integration according to the inverse mapping coefficients.

Figure 10:
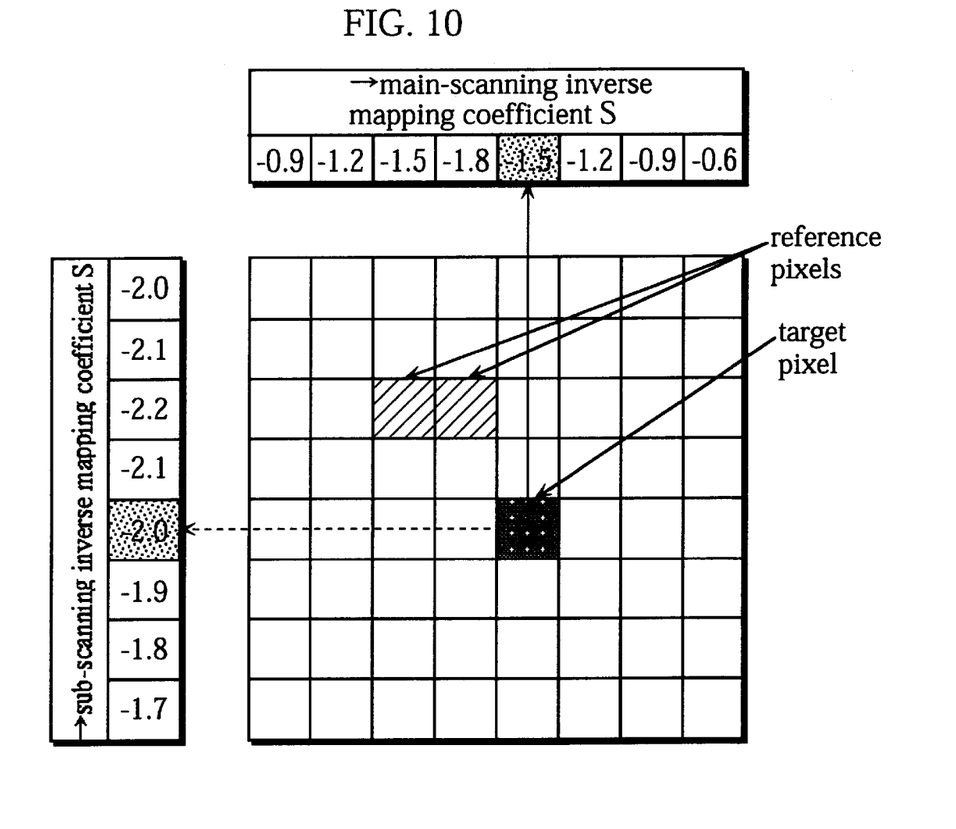
FIG. 10 is a drawing to help explain the density distribution processing that is performed using inverse mapping coefficients.

FIG. 10 is a drawing to help explain how the corresponding pixel before correction is detected using the inverse mapping coefficients. In the figure, one box represents one pixel, and the pixel before correction is referred to as the "reference pixel." Suppose that the filled-in pixel shown in FIG. 10 represents a pixel after the correction. Note that a pixel after the correction is referred to as the "target pixel" in FIG. 10. In this example, according to the inverse mapping coefficients that have already been obtained, the main-scanning inverse mapping coefficient S corresponding to the target pixel is −1.5, and the sub-scanning inverse mapping coefficient T is −2.0. This indicates that the pixel situated two pixels ahead of the target pixel is the reference pixel in the sub-scanning direction, and that the pixel situated one and half pixels ahead of the target pixel is the reference pixel in the main scanning direction. Yet, the reference pixel in the main scanning direction cannot be determined since it is detected to be situated one and half pixels ahead. In this case, two pixels that are respectively situated one pixel ahead and two pixels ahead are determined as the reference pixels, as shown in FIG. 10. Here, the value of the fractional portion of the inverse mapping coefficient is 0.5 and, therefore, the mean density level of the two pixels is determined as the density level of the target pixel.

Accordingly, the image forming position is corrected while reproducing an image with the optimum density level as a whole and preventing tiers from appearing in units of pixels on the reproduced image.

Third Embodiment

In the third embodiment, the amount of correction is calculated using a function that is obtained by superposing a predetermined auxiliary function on the correction approximation function obtained according to the method explained in the first embodiment. The processing for calculating the amount of correction using this function is explained in the third embodiment. The processing is performed with the aim of preventing noise streaks from appearing when images for the reproduction colors are superimposed. The noise streaks are caused by tiers appearing in units of pixels as described in the second embodiment.

Figure 11:
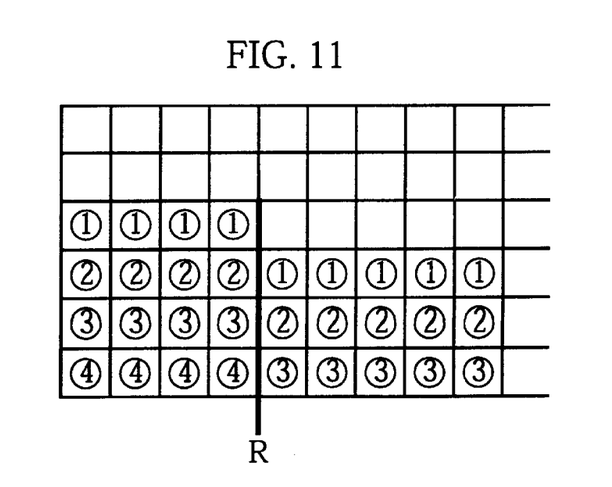
FIG. 11 is a drawing to help explain why noise streaks occur to a reproduced image.

A more detailed explanation about noise streaks is given, with reference to FIG. 11. FIG. 11 is a drawing to help explain why the noise streaks occur to a reproduced image. It should be noted here that the density distribution processing described in the second embodiment has not been performed for the example shown in FIG. 11. The reproduction color used in this example may be any one of C, M, and Y.

In FIG. 11, one box represent one pixel, and an image is to be formed in each box in which ①, ②, ③, or ④ is written. These numbers indicate respective scanning lines. To be more specific, the image is formed on the boxes with the number ① at the first scanning process, and then the images are sequentially formed into the boxes with the respective numbers ②, ③, and ④ corresponding to the following scanning processes. In this case, the correction approximation functions are the same for each scanning line since the auxiliary function is not superposed. Thus, one pixel of tier appears every scanning line as shown in FIG. 11. As a result, a noise streak may occur at the position indicated by R.

This noise streak occurs since the correction approximation functions are the same for each scanning line. On this account, a function obtained by superposing the auxiliary function on the correction approximation function is used for calculating the amount of correction in the present embodiment.

With regard to the auxiliary function to be superposed, a periodic function that is periodically changed with respect to addresses in the sub-scanning direction can be used. The periodic function is used on the grounds that the noise streak can be reduced through diffusion performed around R. Specifically, the noise streak can be made less obvious when one pixel of tier appearing for each scanning line is diffused in the main scanning direction by superposing the periodic function.

In the present embodiment, an explanation is given for a case where a periodic function that takes addresses in the sub-scanning direction as a variable is used as the auxiliary function to be superposed on the correction approximation function that is in turn used for calculating the amount of correction $\Delta X$ in the main scanning direction. As described later, other kinds of auxiliary functions may be used and various methods may be employed for superposition.

As one example of such a correction approximation function, Equation 8 is shown below. This equation is obtained by superposing the auxiliary function on Formula ① described in the first embodiment. This auxiliary function periodically changes in the main scanning direction in accordance with the address in the sub-scanning direction. Although a sine function is used in this example, the periodic function to be used here is not limited to this. As described later, various kinds of periodic functions may be used.

$$\Delta X \cong \frac{(Ps + Pe - 2Pc) \times X^2}{2L^2} +$$

Equation 8

-continued
$$\frac{(Pe - Ps) \times X}{2L} + Pc + A \sin By$$

An explanation is given in regard to setting the amplitude A and the period B. In general, the amplitude and period cannot be defined since they may need to be changed according to various conditions, such as the resolution and gradation characteristic of the image forming apparatus and the type of image data. In the present embodiment, however, it is preferable to set changes in amplitude at one pixel or so in the upward and downward directions respectively. Also, one period preferably corresponds to several tens of pixels or several hundred pixels. The period and, amplitude in particular, should not be greatly increased since, if so, there would be no meaning to execute the correction here.

By means of the processing method of the present embodiment, noise can be prevented from appearing on a reproduced image under light load of processing. Noise streaks can be reduced without having to perform the density distribution processing. Even when the density distribution processing is executed with a change in amplitude of the periodic function being limited to one pixel or less, the ratio of density distribution can be made rough.

The auxiliary function is not limited to a sine function as described above, and various kinds of functions may be used as long as they are typical periodic functions. In the present embodiment, the periodic function that takes addresses in the sub-scanning direction as a variable is used as the auxiliary function to be superposed on the correction approximation function that is used for calculating the amount of correction $\Delta X$ in the main scanning direction. However, the method of superposition is not limited to this, and various methods may be used. Examples are shown as Equations 9 below. The first equation is obtained by superposing the periodic function that takes addresses in the main scanning direction as a variable (A sin Bx, for example) on the correction approximation function used for calculating the amount of correction $\Delta X$ in the main scanning direction. The second and third equations are respectively obtained by superposing the periodic functions that take addresses in the main scanning and sub-scanning directions as variables on the correction approximation function used for calculating the amount of correction $\Delta Y$ in the sub-scanning direction. Furthermore, it is easy to correct the image forming position using a combination of these equations.

$$\Delta X \cong \frac{(Ps + Pe - 2Pc) \times X^2}{2L^2} +$$
$$\frac{(Pe - Ps) \times X}{2L} + Pc + A \sin Bx$$
$$\Delta Y \cong \frac{(Qs + Qe - 2Qc) \times X^2}{2L^2} +$$
$$\frac{(Qe - Qs) \times X}{2L} + Qc + A \sin Bx$$
$$\Delta Y \cong \frac{(Qs + Qe - 2Qc) \times X^2}{2L^2} +$$
$$\frac{(Qe - Qs) \times X}{2L} + Qc + A \sin By$$

Equations 9

As in the case of the second embodiment, inverse mapping coefficients in the main scanning and sub-scanning directions may be obtained in advance from the correction approximation functions on which the auxiliary function has been superposed. Using the inverse mapping coefficients, a pixel before correction can be detected by paying attention to pixels after the correction.

In the present embodiment, the image forming positions are corrected using a function that is obtained by superposing an auxiliary function on the correction approximation function. However, correction may be first performed using the correction approximation function and then correction may be performed again using the auxiliary function. Specifically, after the address correction is performed in the main scanning and sub-scanning directions using the correction approximation function in steps S100 to S140 of the flowchart shown in FIG. 6, the address correction may be performed again using the auxiliary function. Alternatively, the address correction based on the auxiliary function may be performed first before the address correction using the correction approximation function.

Modifications

The present invention has been described in accordance with the first to third embodiments and their corresponding modification examples. It should be obvious that the present invention is not limited to these embodiments, so that the following modifications can be made.

(1) In each of the stated embodiments, a V-shaped mark is used as a registration mark. However, the shape of a registration mark is not limited to this, and various shapes can be employed. For example, an angle that a CD line makes with its corresponding sloped line is not limited to 45° angle, and may be a different angle. Also, the size of a registration mark can be changed.

The registration marks formed in the same color are aligned in the direction parallel to the main scanning direction. However, the registration marks may not be aligned in the direction parallel to the main scanning direction as long as an appropriate correction is performed after the optical sensor unit 25 has detected them. It should be noted here that, to obtain the correction approximation functions, at least two registration marks need to be formed at different positions in the main scanning direction.

(2) In the stated embodiments, the black registration mark 50K$s$ is set as the reference mark. With respect to the reference mark, the deviations of the other black registration marks 50K$c$ and 50K$e$, and the other color registration marks can be obtained. However, the deviation of the registration mark 50K$s$ itself may be obtained so as to correct the image forming position. More specifically, the number of clocks may be counted from reception of a driving start signal of a registration roller or another reference signal to the detection of the registration mark 50K$s$. Then, the number of clocks may be compared with a reference number of clocks that has been obtained in advance. From the difference between the numbers, the deviation of the registration mark 50K$s$ in the sub-scanning direction can be obtained.

Similarly, the deviation of the registration mark 50K$s$ in the main scanning direction may be obtained through a comparison with a reference value that has been set in advance. That is, a difference between the detection value and the reference value is the deviation of the registration mark 50K$s$. This reference value may be used in the same way for obtaining each deviation of the other registration marks.

(3) In the stated embodiments, the registration marks are formed on the transfer belt 10. However, the registration marks may be formed on a recording sheet that is transported on the transfer belt 10 and may be detected by the optical sensor unit 25. Moreover, if a transfer drum is provided in the image forming apparatus, the registration marks may be formed on the surface of the transfer drum.

(4) In the stated embodiments, the present invention has been described for the copier as an example, and in particular, a tandem-type digital color copier has been described. However, the present invention is not limited to this, and may be applied to various image forming apparatuses, such as printers and facsimiles, as long as they form color images. Also, the present invention can be applied to an image forming apparatus that employs the direct transferring method.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image forming apparatus which includes an image writing unit and forms an image on a recording medium carried on a conveyer that is being transported using the image writing unit, the image forming apparatus comprising;

a controller which controls the image writing unit to form a registration mark at not less than two different positions in a main scanning direction perpendicular to a transporting direction in which the conveyer is transported;

a detecting unit which detects each registration mark formed by the image writing unit;

a deviation obtaining unit which obtains a deviation for each registration mark with respect to a reference position, in accordance with a detection result given by the detecting unit;

a function formulating unit which formulates a correction approximation function from the deviation obtained by the deviation obtaining unit, the correction approximation function being used for determining individually image writing positions for each individual pixel of an image by the image writing unit;

a writing operation correcting unit which controls the image writing unit to perform an image writing operation in accordance with the correction approximation function.

2. The image forming apparatus of claim 1, wherein the correction approximation function is a function that calculates a value indicating the image writing position for each of the pixels in accordance with a position for each of the pixels in the main scanning direction and the deviation obtained by the deviation obtaining unit.

3. The image forming apparatus of claim 2, wherein when the registration mark is formed at N different positions in the main scanning direction, the correction approximation function has a degree that is smaller than N.

4. The image forming apparatus of claim 1, wherein the writing operation correcting unit includes a density distributing unit which determines, in accordance with the correction approximation function, a density level for each of the pixels that is to be used after correction so that a density level of the pixel before the correction is distributed among a plurality of pixels, wherein the writing operation correcting unit controls the image writing unit to perform the image writing operation so as to have the image formed in accordance with the density level determined by the density distributing unit.

5. The image forming apparatus of claim 1, wherein the function formulating unit formulates another correction approximation function by superposing an auxiliary function on the correction approximation function that has been formulated from the deviation, a value of the auxiliary function periodically changing in at least one of the main scanning direction and a sub-scanning direction that is perpendicular to the main scanning direction.

6. The image forming apparatus of claim 1,
wherein the writing operation correcting unit corrects the image writing position in accordance with an auxiliary function whose value periodically changes in at least one of the main scanning direction and a sub-scanning direction that is perpendicular to the main scanning direction, as well as correcting the image writing position in accordance with the correction approximation function.

7. An image forming apparatus which includes a plurality of image holding components set in line in a transporting direction of a conveyer and forms a color image by transferring images formed on the image holding components onto a recording medium carried on the conveyer, the image forming apparatus comprising;
a controller which has N sets of patterns formed on the conveyer, N being an integer that is at least two, each set including a plurality of patterns formed in the transporting direction, and each set being formed at a different position in a main scanning direction perpendicular to the transporting direction;
a detecting unit which detects each pattern and obtains a deviation of the pattern with respect to a reference position; and
a calculating unit which formulates a correction approximation function used for individually correcting image forming positions for each individual pixel of an image, in accordance with detection results given by the detecting unit.

8. The image forming apparatus of claim 7,
wherein the correction approximation function formulated by the calculating unit is an $(N-1)^{th}$ degree function.

9. The image forming apparatus of claim 7 further comprising a correcting unit which corrects the image forming positions in accordance with the correction approximation function.

10. The image forming apparatus of claim 9, wherein the correcting unit determines, in accordance with the correction approximation function, a density level for each of the pixels that is to be used after correction so that a density level of the pixel before the correction is distributed, and corrects the image forming positions so as to have the image formed in accordance with the determined density level.

11. The image forming apparatus of claim 9,
wherein the correcting unit corrects the image forming positions in accordance with a function obtained by superposing a periodic function on the correction approximation function, the periodic function being associated with the transporting direction or the main scanning direction.

12. The image forming apparatus of claim 11,
wherein the correcting unit determines a density level for each of the pixels that is to be used after correction, in accordance with a function obtained by superposing a periodic function associated with the transporting direction or the main scanning direction on the correction approximation function, so that a density level of the pixel before the correction is distributed, and corrects the image forming operation so as to have the image formed in accordance with the determined density level.

13. A method of correcting an image forming operation, comprising:
a step of forming N sets of registration marks using an image writing unit, N being an integer that is at least two, each set including a plurality of registration marks formed in a sub-scanning direction, and each set being formed at a different position in a main scanning direction perpendicular to the sub-scanning direction;
a step of detecting each registration mark formed in the forming step;
a step of obtaining a deviation of the detected registration mark with respect to a reference position; and
a step of formulating a correction approximation function used for individually correcting image writing positions for each individual pixel of an image by the image writing unit, in accordance with the obtained deviation; and
a step of correcting the image writing positions in accordance with the formulated correction approximation function.

14. The method of correcting an image forming operation of claim 13,
wherein the correction approximation function is an $(N-1)^{th}$ degree function.

15. The method of correcting an image forming operation of claim 13,
wherein the correcting step includes:
a sub-step of determining, in accordance with the correction approximation function, a density level for each of the pixels that is to be used after correction so that a density level of the pixel before the correction is distributed among a plurality of pixels; and
a sub-step of controlling the image writing unit to perform an image writing operation in accordance with the determined density level so as to reduce a deviation of a formed image.

16. The method of correcting an image forming operation of claim 13,
wherein, in the step of formulating the correction approximation function, another correction approximation function is formulated by superposing an auxiliary function on the correction approximation function formulated in accordance with the obtained deviation, a value of the auxiliary function periodically changing in the main scanning direction or the sub-scanning direction.

17. The method of correcting an image forming operation of claim 13, wherein, in the correcting step, the image writing positions are corrected in accordance with an auxiliary function whose value periodically changes in the main scanning direction or the sub-scanning direction, as well as being corrected in accordance with the correction approximation function.

* * * * *